Oct. 31, 1939.　　　　G. SPATTA　　　　2,178,350
METHOD OF MAKING AXLE HOUSINGS
Filed March 5, 1937
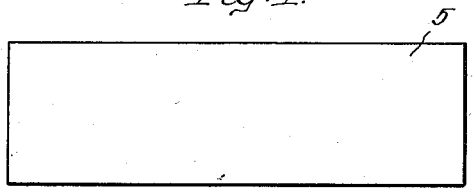
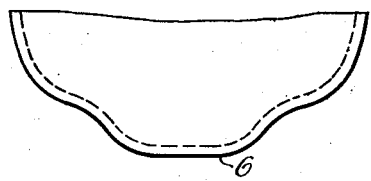
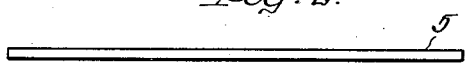
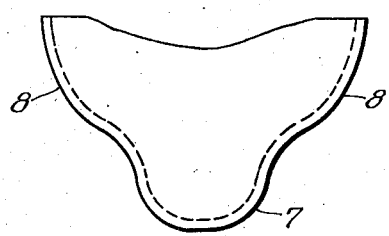
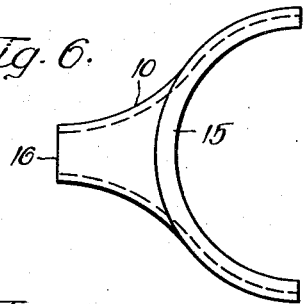
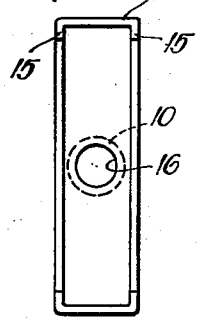
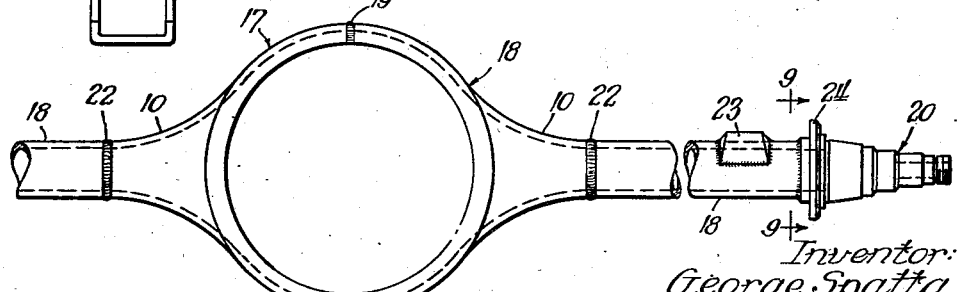
Inventor:
George Spatta.

Patented Oct. 31, 1939

2,178,350

UNITED STATES PATENT OFFICE 2,178,350

METHOD OF MAKING AXLE HOUSINGS

George Spatta, Buchanan, Mich., assignor to Clark Equipment Company, Buchanan, Mich., a corporation of Michigan Application March 5, 1937, Serial No. 129,176

2 Claims. (Cl. 29—153.1)

This invention relates to axle housings and the method of forming the same, the more particularly is directed to axle housings of the banjo type used for the rear axles of automobiles, trucks, busses, tractors and similar vehicles.

The present invention contemplates the fabrication of an axle housing of this type from flat plate stock, and involves the separate formation of the banjo frame portion and arms of the housing, with subsequent joining of these parts into a substantially integral assembly capable of meeting the requirements imposed on structures of this type.

In the preferred embodiment of the present invention I propose to form the arms of the housing by rolling up flat blanks into tubular form and welding the longitudinal seams thereof, preferably by fusion welding, to form substantially integral tubular arms. One end of each of these arms is then swaged down in a manner similar to that described in the Mogford and Spatta patent, No. 1,978,685, of October 30, 1934, providing wheel bearing seats for a full-floating type of axle assembly, or upset in the manner shown in my Patent No. 2,053,975 of September 8, 1936, to provide a brake flange and enlarged bearing seat for axle housings of the passenger car type.

The banjo portion of the housing I propose to form by providing a flat blank of sheet stock, which is subjected to a series of drawing operations to form the throat portion and a half of the cylindrical banjo frame sections. After the drawing operations, the blank is trimmed to the desired dimensions. Two such sections are then welded together to form a complete banjo frame portion, with oppositely extending throats, to which are welded the untreated ends of the tubular arms. Of course, the arms may be welded to the half banjo frame sections prior to joining of these sections, if so desired.

One object of the present invention is to fabricate an axle housing of this type from flat stock, which will possess all the desired characteristics of strength, size and appearance, and which is of relatively economical design.

Still another feature of the present invention is the formation of an axle housing by separate forming operations on blanks of flat stock to form the arm and banjo sections, respectively.

Another advantage provided by the present invention is the ability to form a large number of axle housings for various requirements, wherein certain portions of the housing can be employed in various types of housings. For example, for both passenger and the smaller size of truck housings the banjo portions can be formed in the same manner, with the arms also formed in the same manner but subjected to different end operations. Similarly, variations in either banjo or arm dimensions can be accommodated without requiring a change throughout all the component parts of the housing.

Other objects and advantages of the present invention will appear more fully from the following detailed description which, taken in conjunction with the accompanying drawing, will disclose to those skilled in the art the particular construction and method of formation of a preferred embodiment of the present invention.

In the drawing:

Figure 1 is a plan view of the blank used in the present invention for forming a portion of the banjo frame;

Figure 2 is a side elevational view thereof;

Figure 3 shows the blank after the first series of drawing operations;

Figure 4 illustrates a further drawing operation upon the blank;

Figure 5 shows the blank at the completion of the drawing operations;

Figure 6 shows the blank after it has been trimmed and shaped;

Figure 7 is an end elevation of the blank shown in Figure 6;

Figure 8 is an elevational view of a housing constructed in accordance with the present invention; and Figure 9 is a sectional view taken substantially on line 9—9 of Figure 8.

Referring now in detail to the drawing, the blank 5 shown in Figs. 1 and 2 is a flat sheet stock similar to boiler plate or the like, which can be cut from strip material to the desired length and width.

The blank 5 is supported on a suitable die structure and subjected to a drawing operation, which may comprise a series of steps tending to shape the blank 5 to the form shown in Fig. 3 having a cup-shaped configuration with a reduced portion 6 disposed substantially centrally of the blank and of substantially oval or rectangular section.

The blank is then subjected to an additional drawing operation which moves the metal thereof into the position shown in Fig. 4, the portion 6 of Fig. 3 being extended downwardly to the position shown at 7, and the remaining portion of the blank being formed to generally cylindrical shape as shown at 8. It is to be understood that during these drawing operations, the metal is confined so that successive transverse sections taken through the blank shown in Figs. 3 and 4 will approximate rectangular shapes having the longer dimension in the plane of the length of the blank 5 of Fig. 1. The portions 8 of the blank shown in Fig. 4 will eventually produce the banjo portion of the frame, while the portion 7 of the blank of Fig. 4 must be still further elongated to form the throat portion of the frame.

The blank is then subjected to a final drawing operation resulting in a construction shown generally in Fig. 5, in which the portion 7 has been extended and reduced in cross section to form the throat portion 10, while the upper portion of the blank has assumed a full rounded shape as indicated at 12, and has become rectangular in transverse section with the portion 13 thereof forming a flange extending normal to the web portion defining the cylindrical surface of the banjo frame. The blank shown in Fig. 5 is then subjected to a trimming operation along the dot and dash line indicated at 14, which produces the banjo flange 15 shown in Fig. 6, terminating at opposite diametrical portions to form a half circular banjo frame and having the projecting portion 10 trimmed off to form an opening 16 extending from within the flanges 15 outwardly through the tapered throat portion 10 of the blank.

This completes the formation of one half of the banjo frame, the drawing operations and trimming operations being such that the blank as shown in Fig. 6, is complete so far as size and configuration is concerned, and needs only to be machined about the defining edge of the flange 15 in order to be employed in the assembly of the complete axle housing.

Another blank corresponding to the blank 5 is subjected to the same operations as shown in Figures 3, 4, 5 and 6 to form the other half of the banjo frame, the two halves being generally indicated at 17 and 18 in Figure 8, and being joined together by butt or fusion welds or the like at the edges 19 to form the complete central banjo housing having the extending throat portions 10 for joining the same to an axle housing arm. Preferably, if flash welding is employed at the junction points 19, these are suitably trimmed externally of the housing in order to improve its appearance, but with butt or fusion welding, no trimming is ordinarily required.

The axle housing arms are preferably formed from flat stock of the type shown in Figures 1 and 2, which is rolled into tubular blanks by any of the well known tube forming machines having a plurality of rolls which successively curve the opposite longitudinal edges of the blank upwardly and inwardly to form a complete blank having an open longitudinal cleft. The blank is completed by welding the metal in this cleft either by fusion welding or by employing a filler rod or the like, and the arm as thus formed, constitutes a substantially integral tubular blank of required outside diameter and wall thickness. This blank may be subjected at one end to suitable swaging operations as described in connection with the Mogford and Spatta Patent No. 1,978,685 to provide an end construction such as shown at 20 in Figure 8, the tubular blank itself being indicated at 18. The opposite end of the blank 18 is then welded, as indicated at 22, to the defining edge of the throat portion 10 of the banjo frame. A suitable spring pad, such as indicated at 23, may be welded to the arm 18 at the desired point intermediate its ends, and a brake supporting flange 24 is also secured thereto by circumferential welding, as shown in Figure 8. The end portion 20 of the arm is illustrated as being swaged down to decrease its external diameter and increase its wall thickness for the purpose of providing a wheel bearing seat for axle assemblies of the full floating type. However, the present invention is not to be limited to this particular type of housing, since the end of the arm can equally as well be upset as described in my Patent 2,093,975 to form an enlarged bearing seat and brake flange for a passenger car type of vehicle.

It is to be understood that the welding of the arms 18 to the throat portions 10 of the banjo frame sections can either precede or succeed the welding together of the two complementary banjo portions. That is to say, the blank as shown in Figure 6 may be joined to an arm such as the arm 18 to form a half axle housing which can then be joined to a similar half axle housing by welding as indicated at 19.

It is apparent that by providing a housing formed of four parts as indicated, certain of these parts may be standardized for various types of axles. For example, the banjo frame sections 18 and 17 can be made the same for various types of axle housings in which the length or the thickness of the arms, or the manner of forming the ends of these arms is varied in accordance with various requirements. Similarly, the arms may be formed as standard parts which may be joined to various sizes of complementary banjo sections.

I have found that the drawing operations for forming the complementary banjo sections require considerably less power than the expanding operations heretofore employed in connection with axle housings of this type. Further, the drawing operations can be so controlled that no reshaping of the flanges 15 or of the throat portions 10 of the banjo sections is necessary after the trimming operation. By the present method, I considerably facilitate the manufacturing of axle housings, since the parts can all be made separately and consequently, any breakdown of one portion of the plant will not hinder the continued operation of the plant in the fabrication of the other portions of the housing.

It is to be understood, of course, that the throat portions of the half banjo sections, indicated at 10, may be polygonal as well as cylindrical, in which case the arms will also be of the same sectional form.

I am aware that the various steps illustrated in connection with the above description may be varied, depending upon the type of dies and drawing operations employed, and that the various changes of configuration of the flat blank shown in Fig. 1 to the finished blank shown in Fig. 6 may be changed as required under the conditions encountered. I, therefore, do not intend to be limited to the exact details shown and described, but only insofar as defined by the scope and spirit of the appended claims.

I claim:

1. In the method of forming an axle housing, the novel steps which comprise subjecting a flat rectangular shaped blank to a series of drawing operations to cup the same and to provide an elongated central nose portion decreasing in diameter toward its outer extremity and joined to said cup shaped portion by a tapered throat, and simultaneously flatting two sides of the cupped portion into parallel flanges connected by a circular web portion defining a semi-cylindrical banjo frame opening.

2. In the method of forming an axle housing, the novel steps which comprise initially cupping a flat rectangular plate to provide a central projecting nose portion of reduced section and a main cupped body portion, further pressing said blank to increase the projection of the nose portion and to reduce its diameter to less than the width of the main body portion, then pressing the main body portion into a substantially semi-cylindrical parallel side flanged cup provided at its center with the projecting nose portion, and subsequently trimming said blank to cut said side flanges into semi-cylindrical form extending radially inwardly from the semi-cylindrical portion and defining a transverse semi-cylindrical recess in the blank, and cutting the end of the nose portion away to provide an opening therethrough into the bottom of said recess.

GEORGE SPATTA.